INVENTOR
JEROME KURSHAN
BY Harry Tunick
ATTORNEY

May 25, 1954 J. KURSHAN 2,679,592

GENERATOR AND FREQUENCY CONTROL

Filed Aug. 31, 1948 3 Sheets-Sheet 2

INVENTOR
JEROME KURSHAN
BY Harry Tunick
ATTORNEY

INVENTOR
JEROME KURSHAN
BY Harry Tunick
ATTORNEY

Patented May 25, 1954

2,679,592

UNITED STATES PATENT OFFICE 2,679,592

GENERATOR AND FREQUENCY CONTROL

Jerome Kurshan, Princeton, N. J., assignor to Radio Corporation of America, a corporation of Delaware Application August 31, 1948, Serial No. 46,943

3 Claims. (Cl. 250—36)

Figures 1A, 1B:
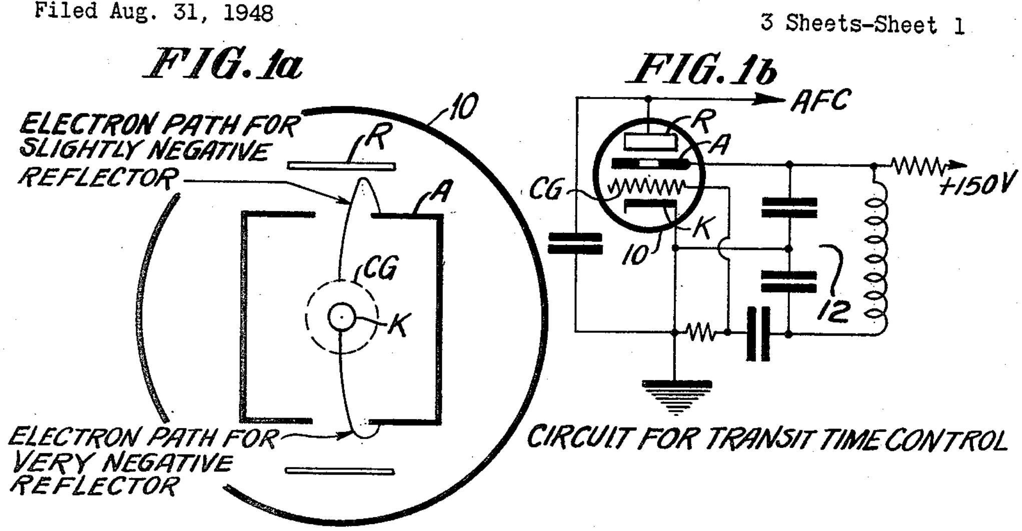

In this application, I disclose a new and improved method of and means for controlling and stabilizing the frequency of oscillatory energy by controlling the tuning of a circuit wherein the oscillatory energy appears or is developed.

Frequently controlling arrangements of various types are known in the art and I make no broad claim to the same as such. For example, Crosby, in his U. S. Patent No. 2,279,659, dated April 14, 1942, has disclosed systems, including a tuned circuit wherein oscillatory energy appears, of a frequency or phase determined by the circuit tuning. The circuit includes as a tuning reactance the complex impedance between two electrodes of a tube that includes an electron receiving electrode and an electron flow control electrode to which voltages of the oscillatory energy frequency are applied in about phase quadrature relation. A discriminator and detector responds to oscillatory energy frequency drifts or changes to provide a potential the magnitude of which changes in a corresponding manner and this potential is used to control the admittance of the tube to control its reactive effect in the circuit wherein the oscillatory energy flows and in a sense to counteract the said drift or change in frequency. These tubes so controlled are tube reactances and have become known as reactance tubes.

These known systems are very useful but become less effective as the frequency of the oscillatory energy to which the circuit is tuned goes up. This is because the interelectrode capacity and transit times are large enough to interfere with the phase shifting circuits supplying the quadrature voltage and the reactance tube plate resistance presents a serious load across the tuned circuit. In practice, this load may be sufficient to stop operation when the tuned circuit is in an oscillation generator.

The need for frequency stabilization increases with frequency since a small percentage oscillator drift results in a considerable frequency change. For example, if the oscillator is to be used as a converter in an FM system, a drift of .01% causes a detuning of 10 kc. in the 100 mc. band. Oscillator drift thus is least harmful at the lower frequencies and is hardest to control at the higher frequencies where the reactances within the oscillator tube form a greater part of the tuned circuit controlling the frequency of operation.

A more specific object of my invention is to provide an improved method of and means for controlling the frequency or phase of operation of tuned circuits operating in the very high frequency range. This object is attained by making use of reactance changes between the electrodes of a tube where the transit time of electrons passing from one electrode or its field to another electrode or its field is of the order of the period of the circuits involved. In these tubes if the transit time or current intensity or both changes, the magnitude of the reactance changes. In my invention I change one or both of these characteristics to control the tube reactance. In specific applications, the said characteristics are controlled to control the phase and frequency of operation of the tube circuit.

I recognize that other combined oscillator frequency control tube arrangements exist. My apparatus, which utilizes the principle disclosed in E. W. Herold's U. S. application #46,915, filed August 30, 1948, now Patent #2,568,395 dated September 18, 1951, differs from prior apparatus in that no external circuit components are used in my apparatus to produce the variable reactance effect. A transit time delay inside the tube is used to accomplish the desired result.

In describing my invention in detail, reference will be made to the attached drawings, wherein:

Figure 1*a* illustrates symbolically an electron discharge device electrode arrangement suitable for transit time control of the electron flow by control of the bias on a reflector electrode relative to the bias on the electron source electrode.

Figure 1*b* illustrates a circuit connections suitable for an electron discharge device as illustrated in Figure 1*a*.

Figures 2, 3A, 3B:
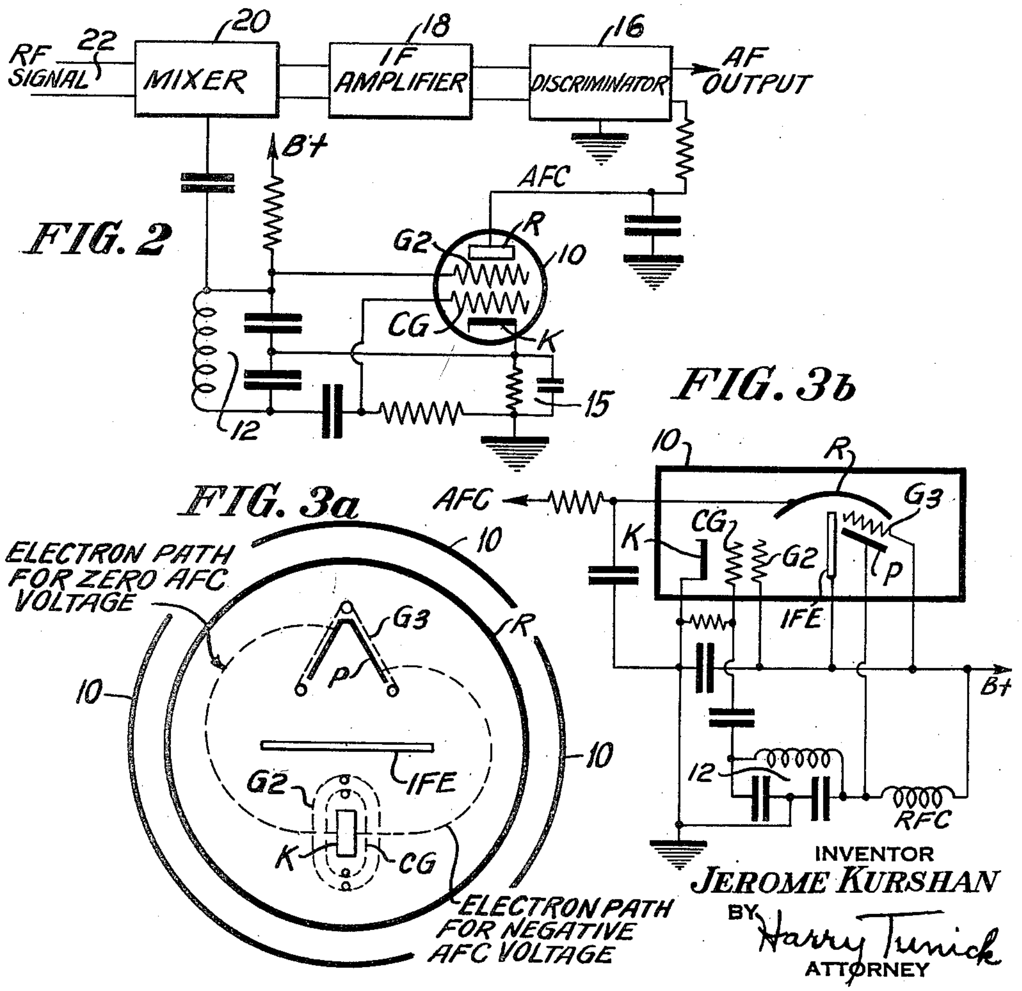

Figure 2 illustrates application of my novel transit time control to a tube of the conventional tetrode type. It also illustrates one manner of deriving the control potential applied to the reflector electrode.

Figures 3*a* and 3*b* are modifications corresponding to Figures 1*a* and 1*b* respectively. In Figs. 3*a* and 3*b* the invention is applied to a novel orbital beam type tube.

Figures 3C, 3D:
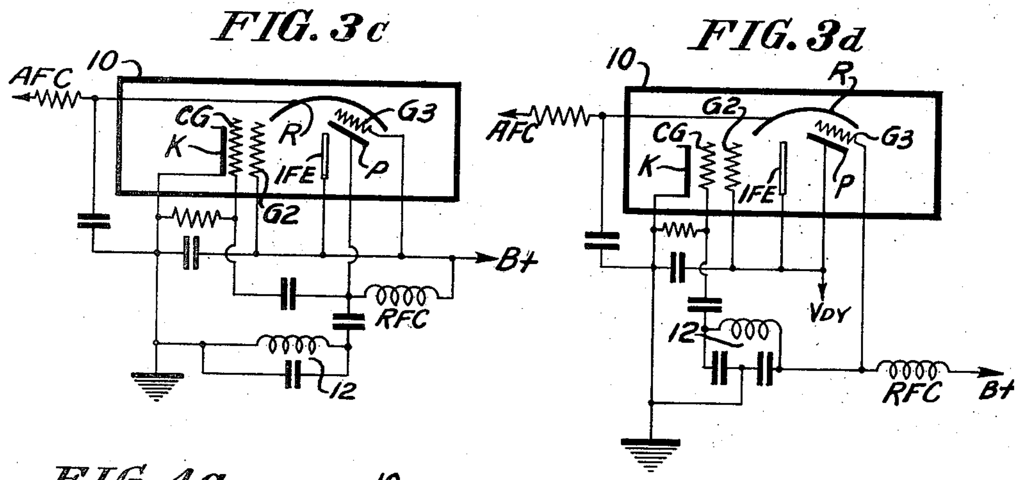

Figures 3*c* and 3*d* are modifications of the circuit of Figure 3*b*.

Figures 4A, 4B:
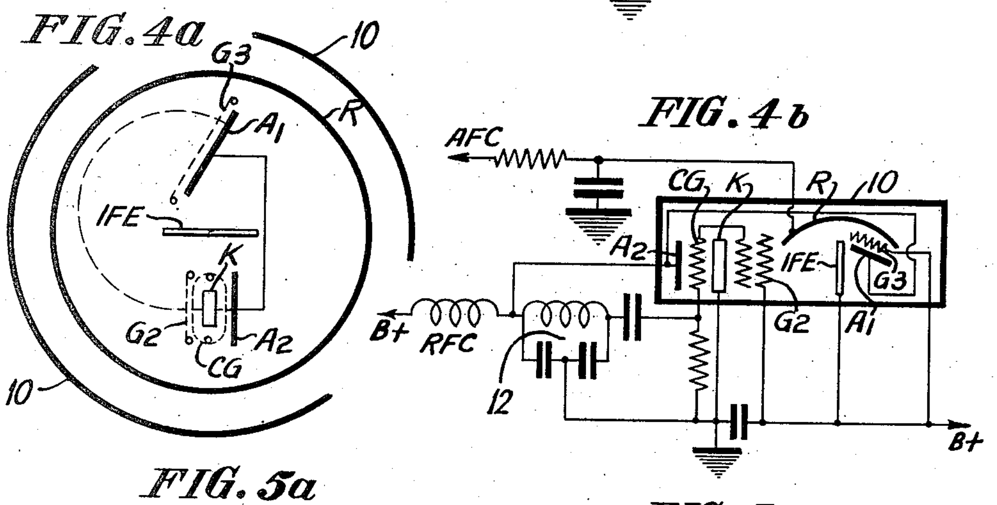

Figures 4*a* and 4*b* are modifications respectively of Figures 3*a* and 3*b*.

Figure 5A:
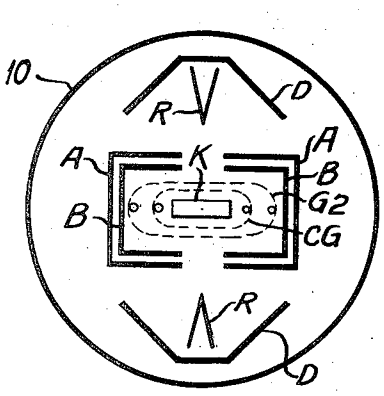
Figure 5B:
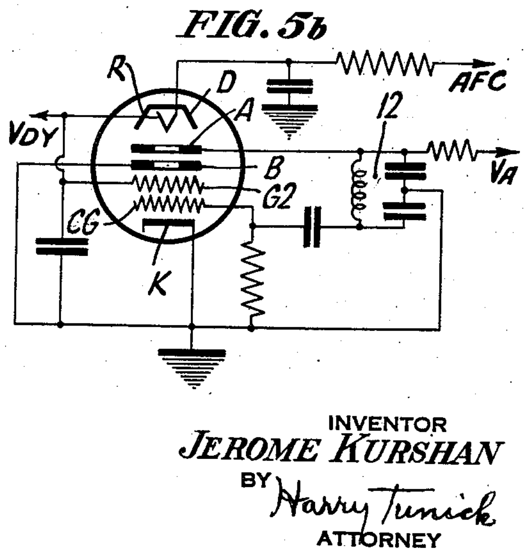

Figures 5*a* and 5*b* illustrate respectively a novel tube which uses secondary emission for transit time control and a circuit arranged in accordance with my invention for generating oscillations of controllable frequency.

Figure 6A:
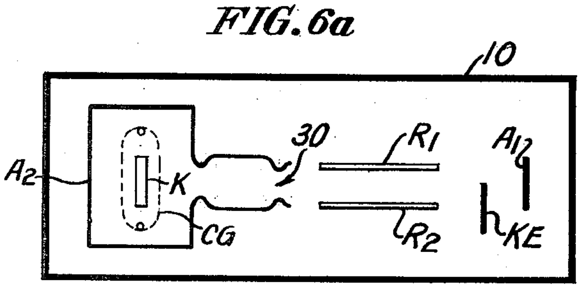
Figure 6B:
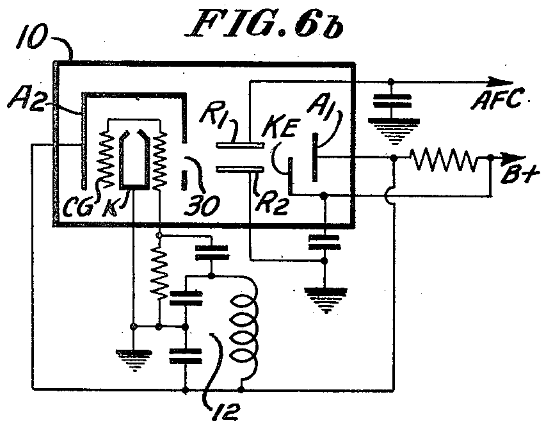

Figures 6*a* and 6*b* illustrates respectively a beam tube with deflection elements and the same in a circuit for controlling the beam current to control the tube reactance.

Figure 7A:
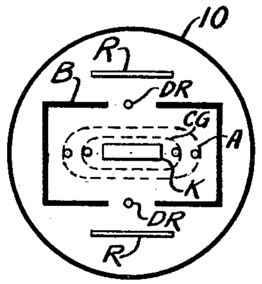
Figure 7B:
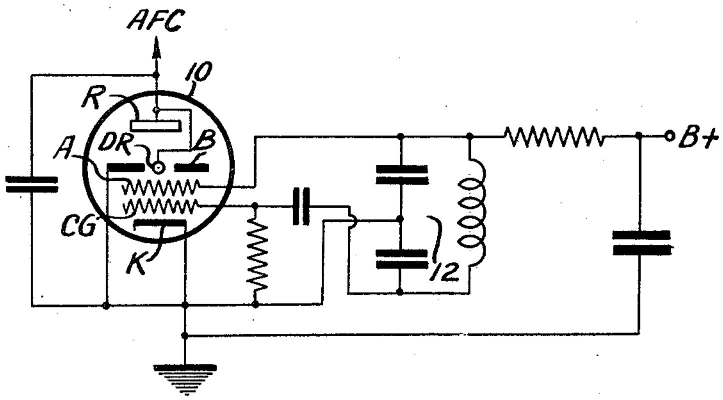

Figures 7*a* and 7*b* illustrate respectively a novel tube and a novel oscillation generator arranged in accordance with my invention.

In a typical electron tube oscillator, the electron tube supplies negative resistance to replenish the dissipated energy. This is accomplished by maintaining a phase-opposed relation between the grid and plate voltages. If this phase difference is varied, a variable susceptance component will also be introduced and will vary the frequency of operation.

Methods of controlling this susceptance are, broadly speaking, the subject of the present invention. In particular this invention describes means for getting the desired phase relations by control of the electron transit time in suitable electron tubes.

For frequencies in the very high frequency range—30 to 300 mc.—or higher, the electron transit times in an electron tube may become appreciable compared with the time of an oscillation period. Thus, the electron stream modulated at an electrode with one phase will arrive at another electrode with a different phase—and one dependent on the transit time. It should be remarked that although the methods described work particularly well in the very high frequency region, there is no intention to restrict the scope of this invention to these frequencies.

Application of this general principle is discussed in the last paragraph of E. W. Herold's abandoned U. S. application Serial No. 752,009, filed June 3, 1947, and in Herold's continuation in part application #46,915, filed August 30, 1948. This principle is described herein by reference to Figures 1*a* and 1*b*, wherein a tube similar in many respects to that disclosed by Herold and a circuit also similar to the circuit which Herold uses are disclosed.

In Figures 1*a* and 1*b*, an electron discharge device 10 has a cathode K, control grid CG, anode A and reflector electrode R. The anode and control grid are coupled to the ends of a tank circuit 12 a point on which is coupled to the cathode K to provide a conventional Colpitts oscillation generator. Oscillations are generated in a well known manner when potentials are applied to the tube electrodes as shown. The operation is modified as follows because of the function of electrode R. In the tube the electrodes are arranged as shown schematically in Figure 1*a*. The electrons leave the cathode and pass through the control grid. A portion of the electrons travel through the gaps in the anode and toward the reflector electrodes. The relatively negative potential on the reflector electrodes causes the electrons to turn back toward the anode electrode. The time and distance the electrons travel before turning back depend on the potential on the electrodes and in particular on the reflector electrode. Thus the phase of the electron current to the anode depends on the potential on the reflector electrode. The frequency of operation of the generator depends on the phase relation of the anode voltage and the electron current flowing to the anode. Thus by changing, as by a control potential or modulation, the potential on the reflector electrode, the frequency of operation of the generator is changed.

In my improved systems, now to be described, improved methods of and apparatus for making use of the transit time reactance control are disclosed. In these systems, I control the tube reactance by controlling the electron transit time, or the magnitude of the electron current or both.

In the embodiment of Figure 2 electron transit time is controlled. The tube may have one or more grids in addition to the control grid. Such tubes are designated tetrodes or pentodes and tube 10 of Figure 2 is shown as a tetrode. It has a second grid G2 acting as the anode electrode in the oscillation generator circuit. The control voltage is put on the plate R and is normally negative to keep electrons from hitting it. There is no need for a suppressor electrode, but the circuit may be made to work with a pentode by connecting the suppressor to the cathode or to the plate, depending on the tube geometry.

Some electrons from the cathode K go directly to the grid G2 after penetrating the grid CG. These have relatively short transit time, contribute mostly to the real part of the transadmittance between first and second grids, and help sustain the oscillations. The electrons which pass through the second grid are reflected back to it by the reflector electrode R. The exact point at which they are turned back, and hence their transit time, is determined by the potential on the reflector R. A cathode bias resistor and shunting capacitor 15 are connected between the cathode K and ground to improve the performance of the balanced discriminator 16 described hereinafter. The transit time will also depend on the second grid voltage, but using this potential to control the frequency will generally yield less sensitivity as well as requiring more power than reflector control.

The control sensitivity S is defined as the derivative of the frequency $f$ with respect to reflector voltage $Vr$. Analysis shows that S goes through successive maxima of increasing amplitude as the transit time is increased. In the VHF range it may be most convenient to operate near the first maximum, with an effective transit angle $\theta=49°$, but an increase in S by a factor of 12 is to be expected for $\theta$ near 360°. The transit angle $\theta$ is defined in customary fashion as 360° times the ratio of the transit time to the period of oscillation. The maximum near $\theta=180°$ is less suitable because of degeneration, but may be utilized by reversing the phase of the feedback connection.

The arrangement shown in Figure 2 has been tried at 100 mc. with a number of tubes operating near the first maximum in S. A 6AK5 was used with the suppressor tied to the cathode (internally) and the plate as a reflector. A 6AU6 was used with the suppressor alternatively at cathode and plate potential. With the 6BE6, the third grid was used as a reflector. A control sensitivity $S=50$ kc./volt for an external tank capacitance of 46 $\mu$f. was obtained for the 6BE6, although oscillations cease unless the reflector is some 20 volts or more negative. Special tubes have been constructed like the 6BE6 but with a solid plate of smaller diameter instead of the third grid. These yielded the same or greater S as the 6BE6 and oscillated down to zero reflector volts.

The control potential may be varied manually to change the reactance or it may represent modulation or the like. In the embodiment illustrated it is derived from a discriminator and detector 16 coupled to the I. F. stages 18 of a superheterodyne receiver or the like having a mixer 20 supplied with R. F. signals on line 22 and with oscillations from the tube 10. If the I. F. frequency deviates, correction of the oscillator frequency is made to return this frequency to the correct value.

The above types of tube have a common characteristic which is interaction of the electrons with the second grid before they are reflected. At best, this reduces the effective transit time. A method of avoiding this is shown in Figures 3*a* and 3*b*. 10 is now an orbital beam tube with an oscillatory circuit 12 connected between grid CG and plate P acting as an anode. The tube 10 also includes an inner focusing electrode IFE, and an outer focusing electrode or reflector R which together provide a suitably curved electron trajectory, and an electron accelerating grid G2 and a shielding grid G3. The purpose of the grids G2 and G3 is to provide an RF field-free space in which the electrons have their long transit time paths rather than to uncouple the control grid and the anode or like electrode. The anode P in this tube is shaped to augment the frequency controlling action. The electron paths are suitably curved by the focussing potential on electrode IFE and the orbits and transit times are varied by the control voltage applied to electrode R. This effect is augmented by slanting the anode P as shown. Operation with $\theta$ near 360° would be desirable, for then the transconductance would be large while its rate of change with reflector voltage could be small, although the rate of change of the trans-susceptance would be maximum. Operation near $\theta=45°$ is possible but not so satisfactory.

In Figure 3*c* the orbital beam tube circuit is shown modified for use of a transit angle $\theta=180°$. Since the phase inversion needed for oscillation is provided by the transit time, the grid CG is coupled directly to the anode P. Frequency controlling voltage is applied to R as in Figure 3*b*. Operation should be similar to the $\theta=360°$ case except for the possible influence of design changes attendant upon the different transit times.

Since in any of these devices greater transadmittance gives greater control sensitivity, increasing this will always be an improvement. Orbital beam tubes have already been described with secondary emission multiplication. This could readily be adapted to the present problem by using the circuits of either Figures 3*b* or 3*c*. In this modification, electrode P may be a secondary emitting dynode at R.-F. ground potential and electrode $G_3$ may be used as the oscillator anode and collector of the secondary electrons. Then the arrangement is as illustrated in Figure 3*d* where the electrode $G_3$ is connected to one end of tank circuit 12 and by a choke RFC to the positive terminal of the direct current source. This potential is higher than the potential on electrode P, now acting at a dynode. The dynode P reduces the effect of interaction between the electrons and the anode G3 in their trajectory from CG to G3. This is because they are multiplied by P when reflected thereat whereas unfavorable interaction involves the smaller current existing before multiplication. Electrode P is grounded for radio frequencies by a bypass condenser.

A modification of the orbital beam tube structure (Figures 4*a* and 4*b*) makes its operation more like that of the ordinary tetrodes considered previously and hence more suitable for smaller ($\theta=45°$) transit angle operation. At this transit angle there is a loss of part of the negative resistance necessary to sustain oscillations. Figures 4*a* and 4*b* show a tube and its circuit where the cathode K emits electrons from both sides. Those to the right anode A2 operate in a conventional short-transfer-time triode oscillator. Those to the left have a long, controllable transit time to the anode $A_1$, and provide the frequency control. With this arrangement the loss in transconductance and hence in negative resistance due to the 45° transit angle in the left hand side of the tube, Figure 4*a*, is made up in the short transit time section in the right hand side of the tube.

The orbital beam tube is not the only way of overcoming the effect of interaction of electrons with $G_2$ before reflection. If the electrons are multiplied by secondary emission on reflection, the interaction of the primary electrons becomes less important for reasons pointed out above. This is achieved as shown in Figure 5*a* by providing a secondary-emitting dynode D inclined at an angle to the anode A. Electrons leaving either side of the cathode K pass through control grid CG and accelerating grid G2, are formed into beams by the beam plate B and are deflected by the control potential on reflector R and the transit times of both primary and secondary electrons are determined by this control potential because of the inclined dynode.

As explained above, the frequency of an oscillator may be controlled by varying the trans-susceptance in parallel with the tank circuit. This variation is possible by leaving the phase approximately constant but varying the magnitude of a susceptive current. In particular, if the current were purely susceptive (reactive), no variation in the oscillation amplitude would result.

Beam deflection devices are ideally suited for this application. Figures 6*a* and 6*b* show a beam deflection tube with the essential elements and connections of the oscillator and control circuits. There is a triode unit designed for optimum operation as an oscillator. The cathode K, control grid CG, and anode A2 are in a somewhat conventional oscillation generator circuit including tank circuit 12. A continuation of the anode A2 has a beam-forming aperture 30 from which a beam of electrons emerges. This beam is deflected by the AFC voltage between electrodes $R_1$ and $R_2$, so that a controllable amount is intercepted by the knife edge electrode KE. The rest of the beam reaches the anode A1 with a transit angle that should be adjusted to $(n-\frac{1}{2})$ 180° where $n$ is a positive integer. The correct phase should be secured by proper design, but adjustments can be made via the operating voltages. The sensitivity of this device will be proportional to the deflection transconductance that can be achieved. A further feature of deflection control is near linear operation with sharp cut-off in both directions. Here too increased sensitivity can be obtained with secondary electron multiplication obtained substantially as shown in Figure 3*d*.

It should be noticed that there is a fundamental difference between transit time control and current intensity control of frequency with a long-transit-time beam. In the former case the transadmittance should be of such phase with respect to the anode voltage as to give a large rate of change of reactance with transit time. In the latter case, the transadmittance should be in exact quadrature with the anode voltage since the transit time is kept constant and only the intensity of current having this transit time is varied.

It is recognized that in cases where frequency control is achieved by the increase in the magnitude of the transsusceptance with increasing transit angle, this effect may be augmented by simultaneously increasing the magnitude of the current subject to control. In Figures 7*a* and 7*b* are pictured a tube and its circuit for doing this.

Part of the current from either side of the cathode K passes through the control grid CG, the anode grid A and through apertures in the beam plates B where it is deflected by the deflecting rods DR and then reflected by the control potential on reflector R, finally returning through the aperture and being collected by the anode A. The rods DR and the reflector R are connected together and so a more negative control potential causes more current to be intercepted by the edges of the aperture in beam plates B. Since these beam plates B are not in the oscillatory circuit, when the transit angle is made smaller by a more negative control potential, the normal decrease in reactive component is augmented and the normal increase in resistive component is counteracted, keeping the oscillation amplitude constant.

The embodiment of Figs. 7*a* and 7*b* also has the further effect of restricting variations in oscillation amplitude because a decrease in the transit angle, which would increase the transconductance component of the transadmittance, is accompanied by a decrease in current reaching the anode, which tends to decrease the transconductance.

I claim:

1. In apparatus for generating wave energy and for controlling the frequency of the generated wave energy, an electron discharge device having an electron emitting cathode, a control grid, an apertured anode enclosing said cathode and control grid, a second anode positioned to receive electrons passing through said aperture, a knife edge electrode and electron deflecting electrodes in said device between said aperture and said second anode, an external, lumped-reactance wave generating circuit coupled to said first anode, said control grid and said cathode, and means for applying a control potential to said deflecting electrodes to alter the number of electrons intercepted by said knife edge electrode and to alter the reactance of said device and the frequency of the wave energy generated.

2. In apparatus for generating wave energy and for controlling the frequency of the generated wave energy, an electron discharge device having an electron emitting cathode, a control grid, an additional grid, an apertured beam intercepting electrode in said device surrounding the aforesaid electrodes, a reflecting electrode in the path of emission from said cathode through said aperture, and a deflecting electrode arranged to control the beam flow through the aperture, an external, lumped-reactance wave generating circuit coupled to said cathode and grids, and means for applying a control potential to said reflecting electrode and to said deflecting electrode to correspondingly change the number of electrons intercepted by said beam intercepting electrode and to correspondingly control the number of electrons reflected back through said aperture and also the frequency of the wave energy generated.

3. In apparatus for generating oscillations and for controlling the frequency of the generated oscillations, an electron beam tube having an electron emitting electrode, an intensity control electrode surrounding said emitting electrode, an apertured beam focusing electrode surrounding the aforesaid electrodes, an apertured anode surrounding all of the aforesaid electrodes, said apertures being in register, and a reflecting electrode adjacent said anode aperture, an external, lumped-reactance oscillation generating circuit coupled to said anode, said control electrode and said emitting electrode, and means for applying a variable control potential to said reflecting electrode to vary the path followed by the emitted electrons passing through said apertures to vary the transit time of the electrons reaching the anode to thereby correspondingly control the frequency of the oscillations generated.

References Cited in the file of this patent

UNITED STATES PATENTS

| Number | Name | Date |
|---|---|---|
| 2,060,770 | Hansell | Nov. 10, 1936 |
| 2,146,607 | Overbeek | Feb. 7, 1939 |
| 2,173,267 | Strutt et al. | Sept. 19, 1939 |
| 2,278,210 | Morton | Mar. 31, 1942 |
| 2,290,587 | Goldstine | July 21, 1942 |
| 2,293,418 | Wagner | Aug. 18, 1942 |
| 2,349,011 | Smith | May 16, 1944 |
| 2,372,210 | Labin | Mar. 27, 1945 |
| 2,425,657 | Tunick | Aug. 12, 1947 |
| 2,434,293 | Stearns | Jan. 13, 1948 |
| 2,434,294 | Ginzton | Jan. 13, 1948 |
| 2,435,601 | Ramo | Feb. 10, 1948 |
| 2,436,397 | Morton | Feb. 24, 1948 |
| 2,454,265 | Jaynes | Nov. 16, 1948 |
| 2,537,769 | Law | Jan. 9, 1951 |
| 2,553,566 | Ferguson | May 22, 1951 |

FOREIGN PATENTS

| Number | Country | Date |
|---|---|---|
| 232,225 | Switzerland | Aug. 1, 1944 |